US012152612B2

(12) United States Patent
Feinauer et al.

(10) Patent No.: US 12,152,612 B2
(45) Date of Patent: Nov. 26, 2024

(54) SAFETY MODULE FOR A PROCESS VALVE AND SYSTEM

(71) Applicant: BUERKERT WERKE GMBH & CO. KG, Ingelfingen (DE)

(72) Inventors: Markus Feinauer, Ingelfingen (DE); Peter Krippner, Ingelfingen (DE)

(73) Assignee: Buerkert Werke Gmbh & Co. KG, Ingelfingen (DE)

( * ) Notice: Subject to any disclaimer, the term of this patent is extended or adjusted under 35 U.S.C. 154(b) by 111 days.

(21) Appl. No.: 17/660,286

(22) Filed: Apr. 22, 2022

(65) Prior Publication Data
US 2022/0341441 A1    Oct. 27, 2022

(30) Foreign Application Priority Data

Apr. 23, 2021   (DE) ...................... 10 2021 110 456.4

(51) Int. Cl.
*F15B 13/042*    (2006.01)
*F15B 21/044*    (2019.01)
(Continued)

(52) U.S. Cl.
CPC ........ *F15B 13/0426* (2013.01); *F15B 21/044* (2013.01); *F15B 21/085* (2013.01);
(Continued)

(58) Field of Classification Search
CPC .. F15B 13/0426; F15B 21/044; F15B 21/085; F15B 2211/40576; F15B 2211/428;
(Continued)

(56) References Cited

U.S. PATENT DOCUMENTS 3,450,160 A * 6/1969 Gerald ................ F15B 13/0857
137/625.64
4,815,496 A * 3/1989 Nishitani ............ F15B 13/0821
137/271
(Continued)

FOREIGN PATENT DOCUMENTS

DE    102013017076 A1    4/2015
DE    202018104833 U1    9/2018
(Continued)

OTHER PUBLICATIONS

Translation of WO-2018202290-A1, Nov. 2018, WO, Maile C.*

*Primary Examiner* — William M McCalister
(74) *Attorney, Agent, or Firm* — McNees Wallace & Nurick LLC

(57) ABSTRACT

A safety module for a process valve and a system comprising a safety module and a process valve are provided. The safety module comprises at least a first interface complementary to a first connection interface of a drive module of the process valve and a second interface complementary to a second connection interface of a process valve actuator of the process valve, such that the safety module can be retrofitted in the process valve. The safety module further comprises at least one safety valve and fluid lines provided for fluidically coupling the safety valve to the drive module and the process valve actuator of the process valve. The at least one safety valve of the safety module is configured for forced venting of the process valve in a safety case.

15 Claims, 2 Drawing Sheets

(51) Int. Cl.
*F15B 21/08* (2006.01)
*F16K 31/122* (2006.01)

(52) U.S. Cl.
CPC . *F16K 31/1221* (2013.01); *F15B 2211/40576* (2013.01); *F15B 2211/428* (2013.01); *F15B 2211/634* (2013.01); *F15B 2211/8636* (2013.01)

(58) Field of Classification Search
CPC ........ F15B 2211/634; F15B 2211/8636; Y10T 137/7761; Y10T 137/86622; Y10T 137/86702; Y10T 137/87209; F16K 31/1221
USPC .............. 137/487.5, 625.65, 625.68, 596.16
See application file for complete search history.

(56) References Cited

U.S. PATENT DOCUMENTS

| | | | | |
|---|---|---|---|---|
| 4,889,164 A | * | 12/1989 | Hozumi | F15B 13/0814 137/884 |
| 5,048,569 A | * | 9/1991 | Stoll | F15B 13/0828 137/884 |
| 5,180,318 A | * | 1/1993 | Moller | F15B 13/0857 137/884 |
| 5,295,511 A | * | 3/1994 | Schleinhege | F15B 13/0857 137/554 |
| 5,518,028 A | * | 5/1996 | Walker | F16K 37/0033 137/554 |
| 5,868,059 A | * | 2/1999 | Smith | F15B 11/044 91/461 |
| 6,135,147 A | * | 10/2000 | Peters | F16K 37/0041 137/554 |
| 7,699,073 B2 | * | 4/2010 | Decker | F15B 11/068 137/599.08 |
| 11,274,683 B2 | | 3/2022 | Neef et al. | |
| 2003/0196457 A1 | * | 10/2003 | Morin | F16K 27/003 65/172 |
| 2008/0099706 A1 | * | 5/2008 | Cook | F16K 37/0041 327/306 |
| 2014/0116542 A1 | * | 5/2014 | Feinauer | F16K 37/0041 137/554 |
| 2020/0191173 A1 | | 6/2020 | Neef et al. | |

FOREIGN PATENT DOCUMENTS

| | | | |
|---|---|---|---|
| WO | 2016101970 A1 | 6/2016 | |
| WO | WO-2018202290 A1 * | 11/2018 | .............. F15B 15/20 |

* cited by examiner

SAFETY MODULE FOR A PROCESS VALVE AND SYSTEM

BACKGROUND

Pneumatic process valves are frequently used to control fluid flows. The purity of the fluid flows is often of extraordinary importance, which is why even the underlying systems should have as few attack surfaces for contamination as possible.

In addition, the piston chamber of the pneumatic process valve must be vented in the event of a safety case (failure) to move the piston into a safety position so that a defined operating state is achieved. Redundant or safety-relevant circuits for pneumatic process valves are already known in the prior art. However, they are either permanently installed in the process valve or are attached to the process valve from the outside or laterally as an extension module.

WO 2018 202 290 A1 discloses a retrofittable extension module, which can be an emergency shutdown module. However, the extension module is arranged on the outside of the process valve. This causes additional gaps and edges where liquids can collect, making the arrangement unsuitable for hygienic applications.

WO 2016 101 970 A1 discloses a basic module comprising at least one pilot valve by means of which the piston chamber can be vented. However, this basic module cannot be retrofitted.

SUMMARY

The invention is therefore based on the object of being able to retrofit a process valve such that venting of the piston chamber is made possible in the event of a safety case for hygienic applications of the process valve.

The object is achieved by the subject matters of the independent claims. Among other things, a safety module and a system are provided. Advantageous embodiments are specified in the dependent claims. Individual aspects are explained with reference to the safety module, others with reference to the system. However, the aspects are to be mutually transferred accordingly.

According to a first aspect, a safety module for a process valve is provided, in particular for a pneumatic process valve. The safety module comprises at least a first interface which is complementary to a first connection interface of a drive module of the process valve. The safety module also comprises a second interface which is complementary to a second connection interface of a process valve actuator of the process valve. Thus, the safety module can be retrofitted in the process valve. The safety module further comprises at least one safety valve and fluid lines which are provided for fluidically and/or electrically coupling the safety valve to the drive module and the process valve actuator of the process valve. The at least one safety valve of the safety module is set up and configured for forced venting of the process valve in a safety case.

Prior to retrofitting of the safety module, the process valve comprises at least a drive module and a process valve actuator. The process valve actuator has at least one movable piston and a piston chamber. The piston chamber can be acted upon with a working medium (e.g. compressed air, working air, control air) to move the piston against a restoring force. Accordingly, the piston chamber can also be vented with respect to the working medium. The drive module is used to aerate/vent the piston chamber. The drive module of the process valve is therefore fluidically coupled to the process valve actuator before the safety module is retrofitted. The first connection interface of the drive module is therefore complementary to the second connection interface of the process valve actuator. As the safety module now has a first and a second interface, which are each individually complementary to the connection interfaces of the drive module and the process valve actuator, the safety module is thus arranged to be placed at the position of the original coupling connection. Thus, on the one hand, the at least one safety valve of the safety module enables forced venting of the process valve and, on the other hand, the safety module is designed for hygienic cases of application of the process valve. Moreover, no additional hose connections are necessary for retrofitting the safety module. Since the safety module can be retrofitted, these advantages can also be achieved with existing process valves which so far do not include a safety circuit for forced venting of the piston chamber.

Hygienic cases of application or the provision of a safety module for a hygienically clean application is understood to mean that there are no additional gaps or voids between components or due to the integration of a component, in which contamination, in particular water droplets, can collect. Systems having additional subsystems attached to the outer sides thereof are considered unhygienic, as the arrangement causes additional edges.

The safety module may comprise a first connection face having at least one first fluid line connection. The safety module may also comprise a second connection face opposite the first connection face having at least one second fluid line connection. The first fluid line connection and the second fluid line connection may be complementary to each other. Thus, the safety module may be set up to further enable a fluid connection for the working medium which originally existed between the drive module of the process valve and the process valve actuator, even after integration of the safety module. To this effect, the safety module may be set up to pass a working medium flow provided by the drive module for the process valve actuator.

The first and second connection faces may be oriented in opposite directions. The first and second fluid line connections may be symmetrical with respect to each other. In particular, the first and second fluid line connections may be symmetrical with respect to a cross-sectional area through the safety module. In this way, the safety module is set up such that it can be placed between the drive module and the process valve actuator. The safety module can therefore also be regarded as an intermediate module. In addition, the safety module can be regarded as an integral part of the process valve once it has been retrofitted.

The at least one safety valve of the safety module may be arranged in a horizontal position. This means that the at least one safety valve may be arranged such that a largest expansion dimension of the safety valve is oriented along one of the largest or second largest expansion dimensions of the safety module. The specification of the second largest expansion dimension is omitted for a cylindrical cross-section of the safety module. The largest expansion dimension of the safety valve can in particular be oriented perpendicularly to the shortest expansion dimension of the safety module. Here, a Cartesian coordinate system is assumed. Advantageously, the installation space required for the safety module can thus be reduced.

An outer contour of the safety module may be cylindrical. A cylindrical outer contour has no edges. Therefore, cylindrical outer contours are considered particularly suitable for hygienic applications.

Alternatively, the outer contour of the safety module may also have another shape. For example, the outer contour may be cuboid-shaped.

The at least one safety valve of the safety module may be a pilot valve.

The safety valve of the safety module may be a solenoid valve, in particular a 3/2-way valve.

The safety module may also comprise at least one control electronics. The control electronics may be set up to control the safety valve of the safety module. The control electronics may also be external. The control electronics of the safety module may be coupled to an external analogue or digital field bus to receive signals for controlling the at least one safety valve, in particular for triggering the safety case for the safety valve so that the process valve is forced-vented. This allows the process valve to be brought into a defined operating state (safety position).

The safety module may comprise at least one working medium return line. The working medium return line may be coupled to the safety valve of the safety module.

The safety valve of the safety module can assume a predefined operating state in the event of a safety case. For example, it can then exclusively ensure a fluidic connection between the second interface and the working medium return line. A de-energized operating state of the safety valve of the safety module may cause the safety valve to assume the operating state according to the safety case. In particular, in the safety case, the safety module may be switched to be de-energized, for example by suitable internal or external switching devices.

According to a second aspect, a system comprising a process valve and a safety module of the type described above is provided. The process valve includes a drive module having a first connection interface and a process valve actuator having a second connection interface. In the retrofitted state, the first interface of the safety module is coupled to the first connection interface of the drive module and the second interface of the safety module is coupled to the second connection interface of the process valve actuator, such that the at least one safety valve and the fluid lines and/or electrical lines of the safety module are fluidically and/or electrically coupled to the drive module and the process valve actuator. The combination of the process valve and the retrofitted safety module advantageously provides the option of forced venting of the process valve, although this was not originally provided (without the retrofitted safety module).

The safety module may have an outer contour which is complementary to the outer contour of the drive module and the process valve actuator of the process valve. In other words, the outer contour of the safety module may be such that homogeneous transitions with respect to the outer contour at the junctions between the safety module and the drive module and between the safety module and the process valve actuator are provided. This advantageously improves the suitability for hygienic applications.

The safety module can be integrated and arranged in the process valve such that no protruding gaps or edges are created in the resulting body. This advantageously prevents contaminations from additionally accumulating at all on the system due to the integration of the safety module. This again increases the suitability of the system for hygienic applications.

The safety module may comprise at least one sensor device set up to determine a position of a piston of the process valve actuator. The sensor device of the safety module may in particular comprise a position sensor and/or a signal transmitter. The piston of the process valve actuator is coupled to a piston rod. The drive module of the process valve comprises a spindle extension which is an extension of the piston rod. The drive module may also comprise a further sensor device, typically also comprising a position sensor. Without the retrofitted safety module, a position of the piston rod can be detected based on the sensor device of the drive module interacting with the spindle extension. Thus, the operating state of the piston of the process valve actuator can be detected and subsequently determined. The safety module can now determine a position of the piston rod and/or the spindle extension based on its own sensor device, optionally comprising a position sensor, to thus determine the operating state of the process valve actuator. Therefore, the safety module can be set up and configured so as to determine the position of the piston of the process valve actuator independently of the drive module of the process valve. For position detection, signal transmitters may be provided on the piston rod and/or the spindle extension. The at least one sensor device of the safety module may be coupled to a safety output to provide sensed data to external or internal control electronics, for example.

The safety module may further comprise at least one control electronics. The latter can be internal or external. The control electronics can control the safety valve. Advantageously, the control of the safety valve of the safety module can be performed independently of the drive module of the process valve. The control electronics can be set up to determine, at least based on received data, the presence of a safety case of the process valve and to control the at least one safety valve of the safety module accordingly. The control electronics can be coupled to a data memory. Sensor values for the at least one sensor device which correspond to specified operating states of the piston of the process valve actuator can be stored in the data memory. The control electronics can then verify whether the safety case has been correctly triggered and executed, i.e. whether the piston has assumed a corresponding safety position based on data provided by the at least one sensor device of the safety module.

The drive module may comprise at least one pilot valve. The at least one pilot valve of the drive module and the safety valve of the safety module may be fluidically coupled according to a series connection. Thus, the safety valve of the safety module may be set up to not interfere with the functionality of the at least one pilot valve of the drive module. Rather, in the normal operating mode of the process valve, the working medium controlled by the at least one pilot valve of the drive module can be passed through to the process valve actuator.

The at least one pilot valve of the drive module may be coupled to second control electronics. The first control electronics can be independent of the second control electronics. This advantageously ensures that control of the pilot valve of the drive module can take place independently of control of the safety valve of the safety module. Thus, the pilot valve and the safety valve can be used for different functionalities of the process valve, for example a normal function (pilot valve) and a failure function (safety case function of the safety valve).

Advantageously, the safety valve of the safety module can be coupled to the drive module such that the presence of a safety case of the safety valve of the safety module is transmitted by signals to the control electronics of the drive module. As a result, a normal function of the pilot valve of the drive module can be prevented by the control electronics of the drive module. To this end, the safety valve may be coupled, for example, to the control electronics of the drive module by means of electrical lines.

Alternatively, the position of the safety valve can also cause an electrical signal that can be used directly to stop the pilot valve of the drive module, as a result of which a normal function of the pilot valve of the drive valve can also be prevented.

The at least one pilot valve of the drive module may also be coupled to a second control electronics arranged in the drive module. The first control electronics of the safety module can be set up to transmit the absence/presence of a safety case to the second control electronics, or to trigger a safety function for at least one pilot valve of the drive module in the presence of a safety case.

Alternatively or cumulatively, a normal function of the at least one pilot valve of the drive module can be prevented by the control electronics of the drive module or the control electronics of the safety module in the event of a safety case. This means that the control electronics of the safety module can determine, for example based on a sensor device, whether the piston has been moved into the safety position. Then, the control electronics of the safety module can transmit this information to a control electronics of the drive module. It is thus possible to adapt a control of the pilot valve of the drive module. For example, it can then be avoided that the pilot valve of the drive module continues to be switched according to the normal function. Instead, a safety function can then also be triggered for the pilot valve of the drive module. The stress on the pilot valve of the drive module can then be advantageously reduced.

Alternatively or cumulatively, the control electronics of the safety module can also directly address at least one pilot valve of the drive module and trigger a safety function. The safety function can correspond to the venting of the process valve, in particular the venting of the piston chamber.

The at least one pilot valve of the drive module may exclusively ensure a normal function of the process valve actuator. Then, the safety valve of the safety module can exclusively ensure a safety function of the process valve actuator. The safety valve of the safety module and the pilot valve of the drive module can thus ensure associated different functionalities. The at least one safety valve of the safety module does not affect the functionality of the at least one pilot valve of the drive module during normal operation of the process valve. Only in the safety case does the at least one safety valve of the safety module then act dominantly. In this way, the process valve is forced-vented in the safety case based on the at least one safety valve of the safety module independently of the drive module.

The system may further comprise a first field bus coupled to the safety module and a second field bus coupled to the drive module. The first field bus and the second field bus may be different from each other. The first field bus and the second field bus may be set up to enable data transmissions according to different communication protocols, in particular according to analogue or digital communication protocols. The first field bus may in particular be coupled to a sensor device and/or control electronics of the safety module. The second field bus can be coupled to control electronics of the drive module. The control of the pilot valve of the drive module and/or the safety valve of the safety module may depend on received data that the respective control electronics may receive from the respective field bus. As the field buses are different or allow communications according to different communication protocols, a safety-related communication concerning the safety case can advantageously take place independently of a communication concerning the normal operation mode. For example, one of the communication protocols may also enable digital communication, which reduces the probability of error.

In the present case, the process valve actuator can be designed as a single-acting cylinder which is extended in the rest state ("normally closed"). Thus, if the piston chamber is not acted upon with the working medium, the restoring force, which can be exerted by a spring, for example, can force the piston into the closed position. This position can therefore also be present for the forced-vented process valve and therefore correspond to the safety position of the process valve actuator. A process medium flow, which is generally regulated by the piston position of the process valve actuator, can then be prevented. Alternatively, the process valve actuator may also be configured as a double-acting cylinder or be retracted in the rest state ("normally open"). In this case, the process valve actuator would be open in the safety position and thus in the forced-venting operating state, so that a process medium flow would not be prevented. The configuration may substantially depend on the component (for example, a spring) of the process valve actuator which causes the restoring force relative to the arrangement of the piston chamber(s). The functionality of the safety valve of the safety module is independent of the design of the process valve actuator.

The drive module may comprise further components, for example a positioner. Accordingly, the piston may also be continuously movable between a plurality of operating positions, for example by means of the positioner. As a result, a process fluid flow regulated by the piston may be more precisely adjustable.

All features discussed with respect to the second aspect may be applied individually or in combination to the first aspect.

BRIEF DESCRIPTION OF THE DRAWINGS

The invention and further advantageous embodiments and further developments thereof will be described and explained in more detail below with reference to the examples shown in the drawings. The features to be taken from the description and the drawings can be applied individually or collectively in any combination in accordance with the invention. In the drawings.

DETAILED DESCRIPTION

Figure 1:
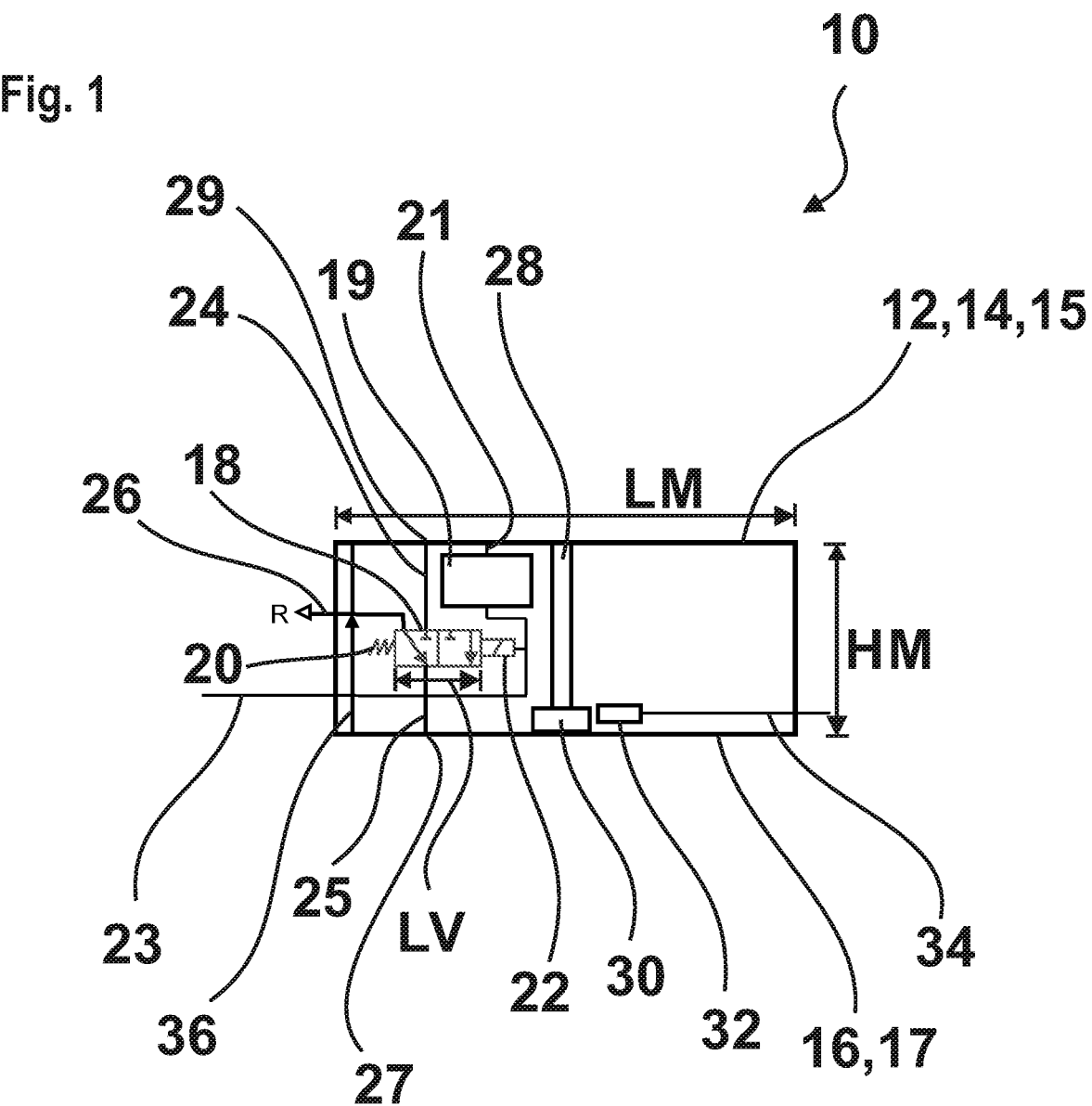
FIG. 1 shows a simplified schematic representation of a safety module.

FIG. 1 shows a simplified schematic representation of a safety module 10. The safety module 10 comprises a housing 12. The housing 12 comprises a first interface 14 and an opposite second interface 16. The interfaces 14, 16 have respective first and second connection faces 15, 17 oriented in opposite directions.

The safety module 10 also comprises a safety valve 18 and control electronics 19. In the present case, the safety valve 18 is designed as a 3/2-way solenoid valve having a return spring 20. Other embodiments are also possible. The safety valve 18 also comprises an adjusting device 22 so that the safety valve 18 can be moved from a first operating position into a second operating position against the force exerted by the return spring 20. For this purpose, the adjusting device 22 is coupled to the control electronics 19 and an electrical supply line 23. The safety valve 18 is fluidically coupled to a first fluid line 24 and a second fluid line 25. The fluid lines 24, 25 extend up to the interfaces 14, 16 and terminate at respective first and second fluid line connections 27, 29. The safety valve 18 is also coupled to a return line 26 for the working medium. The control electronics 19 is furthermore also coupled to the first interface 14 by means of a signal line 21, which can also enable data transmission. The signal line 21 can also enable digital data transmission. By means of the supply line 23, data transmission from the exterior to the control electronics 19, in particular also a digital data transmission can be realized.

In the present case, the safety valve 18 is controlled by the control electronics 19, which transmits corresponding control commands to the adjusting device 22 by means of the supply line 23. The control electronics 19 can be set up to control the safety valve 18, for example, based on data received externally. For example, a safety case may be communicated to the control electronics 19 by an externally coupled field bus (not shown). The safety valve 18 can then be moved to the safety position by the control electronics 19. The control electronics 19 can also be external itself. It is also conceivable that the adjusting device 22 is directly addressed and controlled by an external control.

The control electronics 19 can alternatively or cumulatively be replaced by an internal or external switching device (not shown) or be coupled thereto. The switching device can de-energize the adjusting device 22 in the event of a safety case.

In a first operating position, the safety valve 18 is arranged in a safety position. The safety position may be present when the adjusting device 22 does not exert any force against the return spring 20. The safety position may also be present when the safety valve 18 is de-energized. In this case, the return line 26 is coupled to the second fluid line 25. The first fluid line 24, on the other hand, is disconnected from the second fluid line 25. In a second operating position of the safety valve 18, the first fluid line 24 may be coupled to the second fluid line 25 and the return line 26 is disconnected from the two fluid lines 24, 25. The second operating position of the safety valve 18 may be present when the adjusting device 22 applies sufficient force to overcome the restoring force of the return spring 20.

In the present case, the safety valve 18 is arranged in a horizontal position within the safety module 10. The longest expansion dimension of the safety valve 18, indicated by the arrow LV, is oriented parallel to the longest expansion dimension of the safety module 10, indicated by the arrow LM. The longest expansion dimension of the safety valve 18, indicated by the arrow LV, is also oriented perpendicularly to the shortest expansion dimension of the safety module 10, indicated by the arrow HM. This can advantageously reduce the installation space required for the safety module 10.

The safety module 10 further comprises a spindle extension 28. A signal transmitter 30 is arranged on the spindle extension 28. The safety module 10 comprises a sensor device 32, in the present case a position sensor. By means of the sensor device 32, a position of the signal transmitter 30 of the spindle extension 28 can be detected. The sensor device 32 is coupled to a safety output 34 to be able to transmit the detected operating position of the signal transmitter 30, e.g. to a field bus. The control electronics 19 can also receive measurement signals from the sensor device 32 via the supply line 23. Due to the fact that the sensor device 32 is arranged within the housing 12 of the safety module 10, the safety module 10 is also set up for hygienic applications with regard to the diagnostic components. A power supply for the sensor device 32 can also be provided via the safety output 34. The sensor device 32 can then be set up to be able to provide measurement data even if the other components of the safety module 10 are de-energized.

Figure 2:
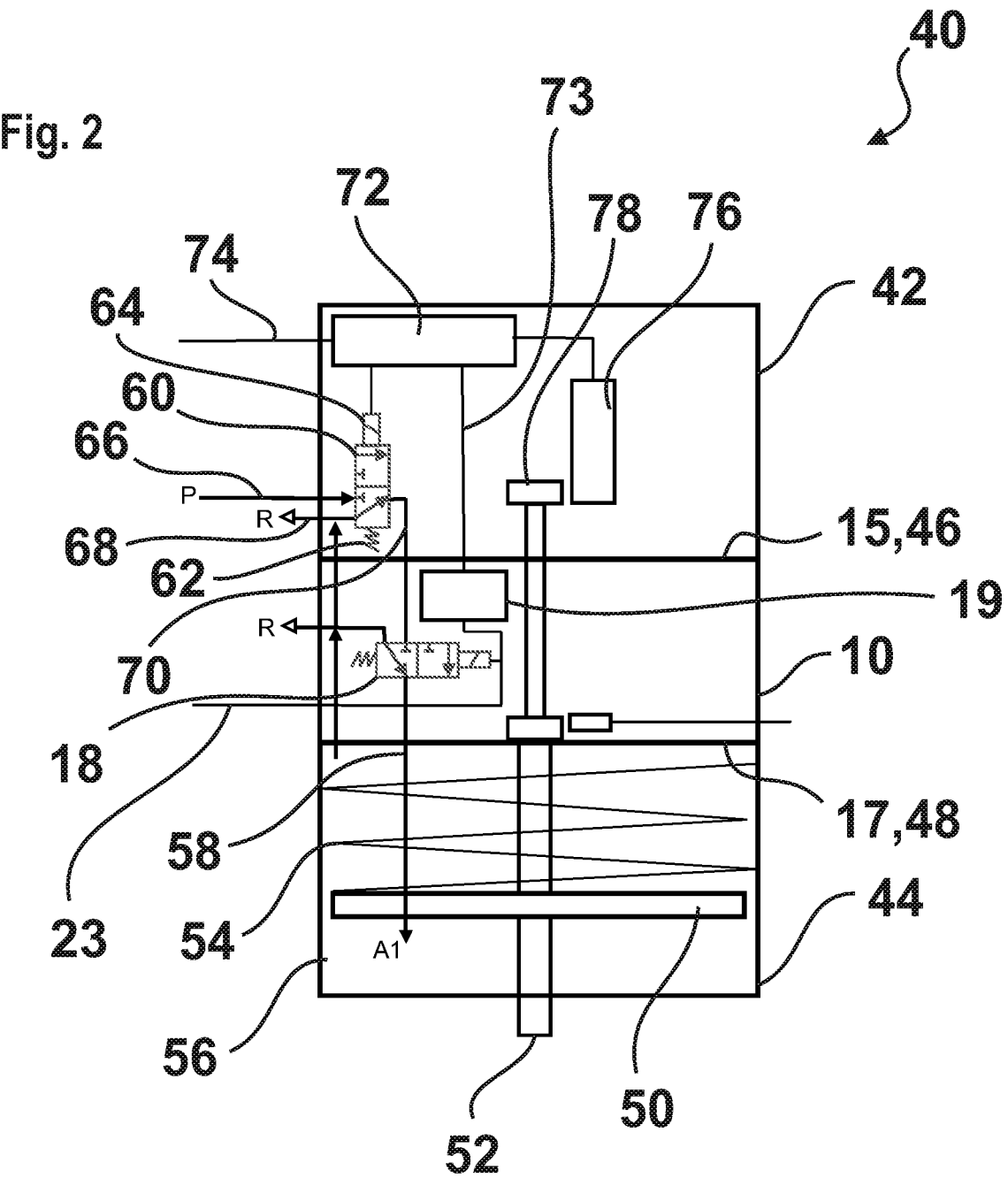
FIG. 2 shows a simplified schematic representation of a process valve with a retrofitted safety module.

FIG. 2 shows a simplified schematic representation of a process valve 40 with a retrofitted safety module 10. A re-explanation of features already shown in connection with FIG. 1 is dispensed with.

The process valve 40 comprises an drive module 42 and a process valve actuator 44. The drive module 42 is coupled to the safety module 10 at the connection point 46. The first interface 14 of the safety module 10 is complementary to the connection interface of the drive module 42. For this purpose, the first interface 14 comprises all necessary electrical lines and fluid lines. In a corresponding manner, the process valve actuator 44 is coupled to the safety module 10 at the connection point 48. To this end, the second interface 16 of the safety module 10 is complementary to the connection interface of the process valve actuator 44. As without the retrofitting of the safety module 10, the connection interfaces of the drive module 42 and the process valve actuator 44 must correspond to each other, this also applies to the first interface 14 and the second interface 16 of the safety module 10. This also means that the retrofitting of the safety module 10 does not require any additional hose connections for the working medium. In the present case, the safety module 10 is configured as an intermediate module.

The process valve actuator 44 comprises a piston 50 and a piston rod 52. The piston 50 can be moved by means of the piston rod 52. The process valve actuator 44 further comprises a return spring 54 and a piston chamber 56. If the piston chamber 56 is not acted upon with a working medium (e.g. compressed air), the piston 50 is brought into a first operating position by the return spring 54. If the piston chamber 56 is correspondingly acted upon with the working medium, the force exerted by the return spring 54 can be overcome so that the piston 50 assumes a second operating position. The position of the piston rod 52 varies accordingly.

In the present case, the process valve actuator 44 is configured as a single-acting cylinder which is extended in the rest state ("normally closed"). Alternatively, it can also be configured as a double-acting cylinder or be retracted in the rest state ("normally open").

The drive module 42 comprises at least one pilot valve 60. The pilot valve 60 is set up substantially similar to the safety valve 18 of the safety module 10. The pilot valve 60 includes a return spring 62 and an adjusting device 64. The pilot valve 60 of the drive module 42 is coupled to a working medium supply line 66 and a working medium return line 68. In addition, the pilot valve 60 is coupled to a working medium line 70. Unless the safety module 10 is retrofitted, the pilot valve 60 is coupled to the piston chamber 56 by means of the working medium line 70 to allow the piston chamber 56 to be acted upon with the working medium or to allow the piston chamber 56 to be vented.

For controlling the pilot valve 60, the drive module 42 comprises control electronics 72. The control electronics 72 is connected to an electrical supply line 74. The electrical connection for the control electronics 72 is preferably arranged on the outside of the drive module housing. The supply line 74 may also be set up to transmit signals to the control electronics 72, on the basis of which the pilot valve 60 is controlled by the control electronics 72.

The drive module 42 also comprises a sensor device 76, in the present case a position sensor. The spindle extension 28 projects into the drive module 42. A further signal transmitter 78 is arranged at the end of the spindle extension 28. Thus, the position of the signal transmitter 78 and thus the position of the piston 50 can be determined by means of the sensor device 76. The control electronics 72 can determine the operating state of the process valve actuator 44 based on the signals from the sensor device 76.

The pilot valve 60 is closed in the non-energized state. This means that the piston chamber 56 is not acted upon with the working medium. The fluid line 70 is then fluidly coupled to the working medium return line 68.

The housing 12 of the safety module 10 has an outer contour that is adapted to the outer contours of the drive module 42 and the process valve actuator 44. Retrofitting the safety module 10 does not create any additional gaps or edges. Therefore, the retrofit also does not cause the risk of contamination accumulation, neither in the inner area nor in the outer area of the process valve 40. This makes the safety module 10 suitable for hygienic applications.

The pilot valve 60 of the drive module 42 is fluidically arranged with the safety valve 18 of the safety module 10 according to a series connection. If a safety case is present, the piston chamber 56 is fluidically coupled to the return line 26. Since the fluid line 70 of the drive module 42 is disconnected from the piston chamber 56, the piston chamber 56 is thus forced-vented. Due to the series connection, the pilot valve 60 of the drive module 42 can be provided exclusively for normal switching of the piston 50 and the safety valve 18 of the safety module 10 exclusively for the safety case. This makes it possible to design the safety valve 18 also with regard to special requirements caused thereby. For example, the safety valve 18 can have a particularly short reaction time and/or a particularly high adjusting speed.

If there is no safety case, the adjusting device 22 of the safety valve 18 of the safety module 10 is energized, which releases the fluidic connection between the fluid line 70 and the piston chamber 56. The piston chamber 56 can then be acted upon with the working medium by the pilot valve 60 of the drive module 42. This results in a movement of the piston 50 against the return spring 54. Therefore, by connecting the safety valve 18 and the pilot valve 60 in series, the functionality of the pilot valve 60 of the drive module 42 is not influenced by the safety module 10, unless a safety case is present.

The safety output 34 to which the sensor device 32 of the safety module 10 is coupled, is preferably coupled to a different circuit or communication network, for example a field bus, than the safety valve 18 and the pilot valve 60 or the control electronics 19, 72 thereof. This enables the sensor device 32 to detect a position of the signal transmitter 30 of the safety module 10 even if the remaining components of the safety module 10, in particular the safety valve 18 are de-energized.

In the present case, the control electronics 19 of the safety module 10 is coupled to the control electronics 72 of the drive module 42 by means of the signal line 73. The signal line 73 can enable analogue or digital signal transmission.

The control electronics 19 of the safety module 10 can transmit the presence of the safety case to the control electronics 72 of the drive module 42. For this purpose, the control electronics 19 may also be appropriately coupled to an optional external switching device to transmit the information even before the power is switched off. As already shown, the control electronics 19 of the safety module 10 can check the presence of the safety case of the process valve 40. For this purpose, the control electronics 19 can receive data from the sensor device 32 of the safety module 10, for example indirectly via an external field bus. If the data transmitted by the sensor device 32 indicate that the piston 50 has been moved into the safety position, it can be determined that the safety case has been correctly and completely triggered and executed.

If the control electronics 72 of the drive module 42 is informed that the safety case is present, the control electronics 72 may suspend control of the pilot valve 60 of the drive module 42. Since the safety valve 18 of the safety module 10 anyway acts dominantly in the safety case, so that the function of the pilot valve 60 of the drive module 42 remains without effect on the process valve actuator 44, the stress on the pilot valve 60 can then be advantageously reduced.

Alternatively or cumulatively, the pilot valve 60 of the drive module 42 can then also be brought in an operating position corresponding to a venting of the piston chamber 56. This increases redundancy.

Alternatively or cumulatively, the control electronics 19 of the safety module 10 may also be set up to directly control at least one pilot valve 60 of the drive module 42 such that the pilot valve 60 also causes venting of the piston chamber 56. This provides redundancy with respect to venting.

Alternatively or cumulatively, the control electronics 19 of the safety module 10 can also be set up to transmit signals to the control electronics 72 of the drive module 42 by means of the signal line 73, on the basis of which the normal function of the pilot valve 60 of the drive module 42 takes place. For example, the (older) drive module 42 may be coupled to an external analogue field bus. In contrast thereto, the retrofitted safety module 10 may be coupled to an external digital field bus. It may then be envisaged to provide for the control of the pilot valve 60 of the drive module 42 via the digital field bus. This can then advantageously reduce the error probability of the communication. Thus, both the normal function of the pilot valve 60 of the drive module 42, with the corresponding signals being transmitted by the control electronics 19 of the safety module 10 to the control electronics 72 or the pilot valve 60 of the drive module 42, and the safety function of the safety valve 18 of the safety module 10 can take place via an external field bus coupled to the safety module 10. Thus, the retrofitting of the process valve 40 with the safety module 10 can result in a reduction in the error probability of the control of the pilot valve 60.

Alternatively, the control electronics 72 of the drive module 42 may be set up to place the safety module 10 in the safety mode. For example, the control electronics 72 may trigger the safety case based on externally received data. The control electronics 72 of the drive module 42 can then transmit signals to the control electronics 19 of the safety module 10 by means of the signal line 73 so that the piston chamber 56 is forced-vented by the safety valve 18.

Alternatively or cumulatively, the safety valve 18 can also be directly addressed and controlled by the control electronics 72 of the drive module 42 in the event of a safety case.

Alternatively or cumulatively, the control electronics 72 can be coupled to an external switching device which causes the safety valve 18 of the safety module 10 to be de-energized in the event of a safety case.

Therefore, the control of the safety module 10 can be based either on an own control electronics 19 of the safety module 10 or on the control electronics 72 of the drive module 42.

Advantageously, the sensor devices 32, 76 are arranged within the housing of the process valve 40. Thus, the suitability for hygienic applications is further increased.

Although the invention has been illustrated and described with respect to one or more implementations, those skilled in the art will determine equivalent changes and modifications upon reading and understanding this description and the accompanying drawings. Furthermore, while a particular feature of the disclosure may have been disclosed with respect to only one of a plurality of implementations, that feature may be combined with one or more other features of the other implementations.

The invention claimed is:

1. A safety module for a process valve, comprising:
   a first interface having electrical lines and fluid lines for being complementary to a first connection interface of a drive module of the process valve and a second interface having electrical lines and fluid lines for being complementary to a second connection interface of a process valve actuator of the process valve, such that the safety module can be retrofitted in the process valve; and
   at least one safety valve and fluid lines provided for fluidically coupling the safety valve to the drive module and the process valve actuator of the process valve,
   wherein the at least one safety valve of the safety module is configured for forced venting of the process valve in a safety case, and
   wherein the first interface includes a first connection face and the second interface includes a second connection face, wherein the first and second connection faces are oriented in opposite directions.

2. The safety module according to claim 1, wherein the first connection face has a first fluid line connection, wherein the second connection face opposite the first connection face has a second fluid line connection, and wherein the first fluid line connection and the second fluid line connection are complementary to each other.

3. The safety module according to claim 2, wherein the first and second fluid line connections are symmetrical with respect to each other.

4. The safety module according to claim 1, wherein the at least one safety valve is arranged in a horizontal position.

5. The safety module according to claim 1, wherein an outer contour of the safety module is cylindrical.

6. A system comprising:
   a process valve and a safety module,
   wherein the process valve includes a drive module having a first connection interface and a process valve actuator having a second connection interface,
   wherein the safety module includes a first interface having electrical lines and fluid lines for being complementary to the first connection interface of a drive module of the process valve and a second interface having electrical lines and fluid lines for being complementary to the second connection interface of a process valve actuator of the process valve,
   wherein the fluid lines of the safety valve are fluidically coupled to the drive module and the process valve actuator of the process valve,
   wherein, in a retrofitted state, the first interface of the safety module is coupled to the first connection interface of the drive module and the second interface of the safety module is coupled to the second connection interface of the process valve actuator such that at least one safety valve of the safety module and fluid lines of the safety module are fluidically coupled to the drive module and the process valve actuator,
   wherein the safety valve of the safety module is configured for forced venting of the process valve in a safety case, and
   wherein the first interface includes a first connection face and the second interface includes a second connection face, wherein the first and second connection faces are oriented in opposite directions.

7. The system according to claim 6, wherein the safety module has an outer contour that is complementary to an outer contour of the drive module and the process valve actuator of the process valve.

8. The system according to claim 7, wherein the safety module is integrated and arranged in the process valve such that no additional gaps or protruding edges are created in a resulting body.

9. The system according to claim 6, wherein the safety module comprises at least one sensor device configured to determine a position of a piston of the process valve actuator.

10. The system according to claim 9, wherein the safety module further comprises at least one control electronics set up to check whether the piston is placed in a safety position at least based on data from the at least one sensor device.

11. The system according to claim 6, wherein the drive module comprises at least one pilot valve configured to ensure a normal function of the process valve actuator, and wherein the at least one pilot valve of the drive module and the safety valve of the safety module are fluidically coupled according to a series connection.

12. The system according to claim 11, wherein the at least one pilot valve of the drive module is coupled to a second control electronics, and wherein a first control electronics is independent of the second control electronics.

13. The system according to claim 11, wherein the at least one pilot valve of the drive module is coupled to a second control electronics, and wherein a first control electronics is set up to communicate to the second control electronics, the absence/presence of a safety case, or at least to trigger a safety function for the at least one pilot valve of the drive module in the presence of a safety case.

14. The system according to claim 11, wherein, in a normal operating mode of the process valve, a working medium controlled by the at least one pilot valve of the drive module is passed through the safety valve of the safety module such that the at least one pilot valve of the drive module ensures a normal function of the process valve actuator, and wherein the safety valve of the safety module exclusively ensures a safety function of the process valve actuator.

15. The system according to claim 6, wherein the system further comprises a first field bus coupled to the safety module and a second field bus coupled to the drive module, and wherein the first field bus and the second field bus are different from each other, or wherein the first and the second field bus are set up so as to enable data transfers according to different communication protocols.

* * * * *